United States Patent
Kearney et al.

(10) Patent No.: US 12,069,062 B2
(45) Date of Patent: *Aug. 20, 2024

(54) APPARATUSES AND METHODS FOR REGULATED ACCESS MANAGEMENT

(71) Applicant: Wells Fargo Bank, N.A., San Francisco, CA (US)

(72) Inventors: Alyssa Suzanne Kearney, Clayton, CA (US); John Laffoon, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/301,428

(22) Filed: Apr. 17, 2023

(65) Prior Publication Data

US 2023/0254317 A1 Aug. 10, 2023

Related U.S. Application Data

(63) Continuation of application No. 16/780,202, filed on Feb. 3, 2020, now Pat. No. 11,757,890.

(51) Int. Cl.
*G06Q 10/0631* (2023.01)
*G06F 16/245* (2019.01)
*G06Q 10/1057* (2023.01)
*G06Q 10/109* (2023.01)
*H04L 9/40* (2022.01)
(Continued)

(52) U.S. Cl.
CPC .......... *H04L 63/102* (2013.01); *G06F 16/245* (2019.01); *G06Q 10/063116* (2013.01); *G06Q 10/1057* (2013.01); *G06Q 10/109* (2013.01); *G06Q 30/018* (2013.01); *G06Q 50/26* (2013.01)

(58) Field of Classification Search
None
See application file for complete search history.

(56) References Cited

U.S. PATENT DOCUMENTS

| 7,522,060 B1 | 4/2009 | Tumperi et al. |
| 8,219,430 B1 | 7/2012 | Thompson et al. |
| 8,799,243 B1 | 8/2014 | Havlik |

(Continued)

OTHER PUBLICATIONS

Z. Chen and I. Arellan, "Better Compliance Management Using Service Oriented Approach for Non-profit Organizations," 2009 Congress on Services—I, Los Angeles, CA, USA, 2009, pp. 195-202, doi: 10.1109/SERVICES-1.2009.118. (Year: 2009).

(Continued)

*Primary Examiner* — Stephanie Z Delich
(74) *Attorney, Agent, or Firm* — K&L Gates LLP

(57) ABSTRACT

Apparatuses, methods, and associated computer program products are provided for regulated access management. An example method includes receiving a request for access from a user device associated with an employee and receiving employee data associated with the employee. The method further includes determining if the employee is subject to a required absence regulation and generating an access attempt notification in an instance in which the employee is subject to the required absence regulation. Determining if the employee is subject to the required absence regulation includes identifying an employee status associated with the employee data and determining that the employee is subject to the required absence regulation based on the employee status.

20 Claims, 9 Drawing Sheets

(51) Int. Cl.
    *G06Q 30/018*     (2023.01)
    *G06Q 50/26*      (2012.01)

(56) References Cited

U.S. PATENT DOCUMENTS

| | | |
|---|---|---|
| 9,111,088 B2 | 8/2015 | Ghai et al. |
| 9,378,476 B1 | 6/2016 | Schwartz et al. |
| 9,679,265 B1 | 6/2017 | Schwartz et al. |
| 10,819,827 B1 | 10/2020 | Aykin |
| 11,132,630 B1 | 9/2021 | Jacobs et al. |
| 2002/0138280 A1 | 9/2002 | Drabo |
| 2004/0243428 A1 | 12/2004 | Black et al. |
| 2005/0137925 A1 | 6/2005 | Lakritz et al. |
| 2006/0282660 A1 | 12/2006 | Varghese et al. |
| 2007/0143827 A1 | 6/2007 | Nicodemus et al. |
| 2008/0209505 A1 | 8/2008 | Ghai |
| 2009/0089132 A1 | 4/2009 | Nallapaty et al. |
| 2011/0320231 A1 | 12/2011 | Podgurny et al. |
| 2012/0030128 A1 | 2/2012 | Nelson et al. |
| 2012/0089432 A1 | 4/2012 | Podgurny et al. |
| 2012/0089493 A1 | 4/2012 | Podgurny et al. |
| 2013/0110736 A1 | 5/2013 | Savage et al. |
| 2014/0114874 A1 | 4/2014 | Nelson et al. |
| 2015/0019278 A1 | 1/2015 | Belval et al. |
| 2015/0100503 A1 | 4/2015 | Lobo et al. |
| 2015/0262105 A1 | 9/2015 | Jeffries et al. |
| 2015/0339620 A1 | 11/2015 | Esposito et al. |
| 2016/0012372 A1 | 1/2016 | Patel et al. |
| 2016/0180280 A1 | 6/2016 | Philipp et al. |
| 2016/0292646 A1 | 10/2016 | Takasaki |
| 2017/0116552 A1 | 4/2017 | Deodhar et al. |
| 2017/0116577 A1 | 4/2017 | Vanamala et al. |
| 2017/0140390 A1 | 5/2017 | Degeneffe et al. |
| 2017/0238130 A1 | 8/2017 | Lempinski |
| 2017/0262813 A1 | 9/2017 | Steffeney |
| 2017/0330197 A1 | 11/2017 | DiMaggio et al. |
| 2018/0018614 A1 | 1/2018 | Vajracharya et al. |
| 2018/0096274 A1 | 4/2018 | DeZeeuw |
| 2018/0349821 A1 | 12/2018 | Zhang et al. |
| 2019/0057340 A1 | 2/2019 | Wang |
| 2019/0139000 A1 | 5/2019 | Sharpe |
| 2019/0272684 A1 | 9/2019 | Pop |
| 2019/0304595 A1 | 10/2019 | Bergman et al. |
| 2020/0250627 A1 | 8/2020 | Alfares |
| 2020/0342414 A1 | 10/2020 | Smith |
| 2020/0380179 A1 | 12/2020 | Tae et al. |
| 2020/0380451 A1 | 12/2020 | Izadi |
| 2021/0201269 A1 | 7/2021 | Ainsworth et al. |

OTHER PUBLICATIONS

Cohen, J. "Working Wall Street: Vacation Rules", Aug. 20, 2004, CBS Marketwatch (2004).

APPARATUSES AND METHODS FOR REGULATED ACCESS MANAGEMENT

CROSS-REFERENCE TO RELATED APPLICATIONS

This is a Continuation of U.S. patent application Ser. No. 16/780,202 filed Feb. 3, 2020, the entirety of which is incorporated herein by reference.

TECHNOLOGICAL FIELD

Example embodiments of the present invention relate generally to employee management and, more particularly, to required absence compliance.

BACKGROUND

Financial institutions and other entities are often subject to regulations, policies, or other restrictions that control various operations of these entities. By way of example, federal guidance dictates that financial institutions are advised to publish and implement polices related to periodic absences for employees in sensitive positions. Through applied effort, ingenuity, and innovation, many of the problems identified with adherence to these policies have been solved by developing solutions that are included in embodiments of the present invention, many examples of which are described in detail herein.

BRIEF SUMMARY

As described above, financial institutions often rely on employees in sensitive positions or roles associated with large financial or legal risk. Due to the sensitive nature of these positions, federal guidance dictates that periodically these employees are required to be absent from their duties to prevent fraudulent activity associated with high risk transactions, restricted trades, or the like. Traditionally, individual business units within financial institutions were tasked with monitoring their respective employees in order to ensure compliance with these required absence regulations. These traditional methods, however, were often insulated from related actives in other business units. As such, inconsistent methods were implemented between business units often resulting in suboptimal scheduling of employees (e.g., simultaneous absence of a particular employee role for the entire entity). Furthermore, these traditional methods failed to consider the dynamic nature of employee designations (e.g., employee position changes) as well as the ability for compliance to be met in varying ways. By way of example, an employee in a sensitive position may schedule vacation, may attend training, may receive a whole or partial exemption, or the like such that a strict scheduling of a required absence is unnecessary.

To solve these issues and others, example implementations of embodiments of the present invention may utilize regulated absence management, dynamic absence organization, and regulated access in order to provide improved regulatory compliance and optimized workflow. In operation, embodiments of the present disclosure may receive a request for compliance confirmation, access, and/or employee data and, identify if the employee data is subject to required absence regulations. Based upon this determination, compliance confirmation, workforce availability, and/or access attempts may be effectively identified and addressed to ensure required absence compliance. In this way, the inventors have identified that the advent of emerging computing technologies have created a new opportunity for solutions for regulatory compliance and employee scheduling which were historically unavailable. In doing so, such example implementations confront and solve at least three technical challenges: (1) they provide improved required absence compliance resulting in reduced fraud, (2) they reliably ensure optimal employee scheduling, and (3) they provide consistent employee access determinations.

Apparatuses, methods, and computer program products are provided for regulated access management. With reference to an example method, the method may include receiving, via a computing device, a request for access from a user device associated with an employee and receiving, via the computing device, employee data associated with the employee. The method may also include determining, via regulation evaluation circuitry of the computing device, if the employee is subject to a required absence regulation. In an instance in which the employee is subject to the required absence regulation, the method may include generating, via access circuitry of the computing device, an access attempt notification.

In some embodiments, receiving employee data may include querying, via absence analysis circuitry of the computing device, an employee data database.

In other embodiments, receiving employee data may include receiving, via the computing device, an absence plan from the user device associated with the employee.

In some embodiments, determining if the employee is subject to the required absence regulation may further include identifying, via the regulation evaluation circuitry of the computing device, an employee status associated with the employee data. In such an embodiment, the method may also include determining, via the regulation evaluation circuitry of the computing device, that the employee is subject to the required absence regulation based on the employee status.

In some embodiments, the method may further include generating, via the access circuitry of the computing device, an absence schedule update in an instance in which the employee fails to satisfy the required absence regulation.

In an instance in which the employee fails to satisfy the required absence regulation, the method may include rejecting, via the access circuitry of the computing device, the request for access.

In an instance in which the employee satisfies the required absence regulation, the method may include permitting, via the access circuitry of the computing device, the request for access.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Figure 1:
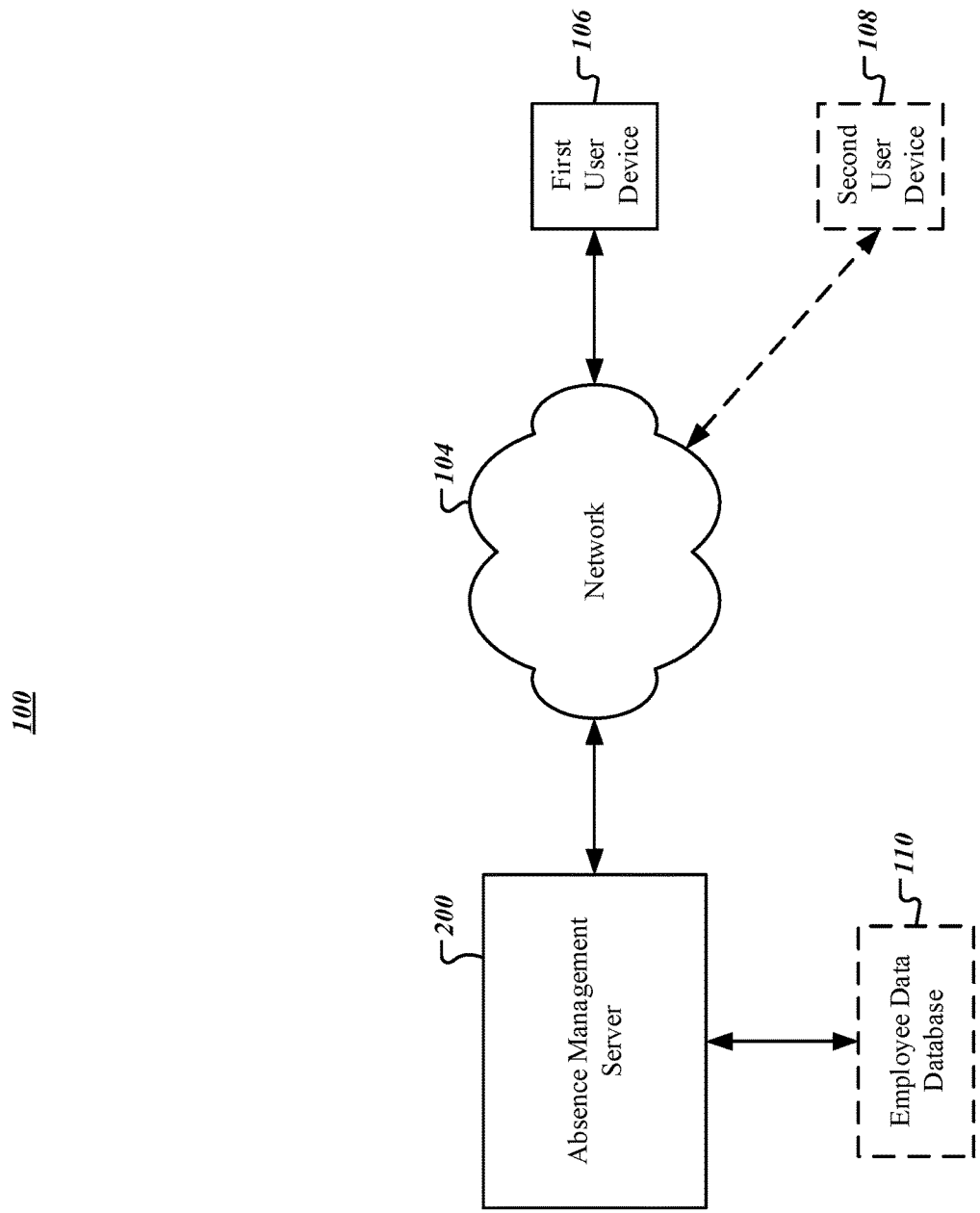
FIG. 1 illustrates a system diagram including devices that may be involved in some example embodiments described herein.

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, the description may refer to an absence management server as an example "apparatus." However, elements of the apparatus described herein may be equally applicable to the claimed method and computer program product. Thus, use of any such terms should not be taken to limit the spirit and scope of embodiments of the present invention.

Definition of Terms

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used herein to mean "serving as an example, instance, or illustration." Any implementation described herein as "example" is not necessarily to be construed as preferred or advantageous over other implementations.

As used herein, the terms "user device," "mobile device," "electronic device," "employee device," and the like refer to computer hardware that is configured (either physically or by the execution of software) to access one or more services made available by an absence management server (e.g., apparatus or computing device of the present disclosure) and, among various other functions, is configured to directly, or indirectly, transmit and receive data. Example user devices may include a smartphone, a tablet computer, a laptop computer, a wearable device (e.g., smart glasses, smart watch, or the like), and the like. In some embodiments, a user device may include a "smart device" that is equipped with a chip or other electronic device that is configured to communicate with the apparatus via Bluetooth, NFC, Wi-Fi, 3G, 4G, 5G, RFID protocols, and the like. By way of a particular example, a user device may be a mobile phone equipped with a Wi-Fi radio that is configured to communicate with a Wi-Fi access point that is in communication with the absence management server 200 or other computing device via a network.

As used herein, the term "employee data database" refers to a data structure or repository for storing employee data, absence plan data, access data, and the like. Similarly, the "employee data" of the employee data database may refer to data generated by or relevant to a user device and associated employee (e.g., account data, access data, scheduling data, position data, or the like). The employee data database may be accessible by one or more software applications of the absence management server 200.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

Having set forth a series of definitions called-upon throughout this application, an example system architecture and example apparatus is described below for implementing example embodiments and features of the present disclosure.

Device Architecture and Example Apparatus

With reference to FIG. 1, an example system 100 is illustrated with an apparatus (e.g., an absence management server 200) communicably connected via a network 104 to a first user device 106 and, in some embodiments, a second user device 108. The example system 100 may also include an employee data database 110 that may be hosted by the absence management server 200 or otherwise hosted by devices in communication with the absence management server 200.

The absence management server 200 may include circuitry, networked processors, or the like configured to perform some or all of the apparatus-based (e.g., absence management server-based) processes described herein, and may be any suitable network server and/or other type of processing device. In this regard, absence management server 200 may be embodied by any of a variety of devices. For example, the absence management server 200 may be configured to receive/transmit data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 2 and described in connection therewith. In some embodiments, the absence management server 200 may be located remotely from the first user device 106, the second user device 108, and/or employee data database 110, although in other embodiments, the absence management server 200 may comprise the first user device 106, the second user device 108, and/or the employee data database 110. The absence management server 200 may, in some embodiments, comprise several servers or computing devices performing interconnected and/or distributed functions. Despite the many arrangements contemplated herein, the absence management server 200 is shown and described herein as a single computing device to avoid unnecessarily overcomplicating the disclosure.

The network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, the network 104 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the network 104 may include a public network, such as the Internet, a private network, such as an intranet, or combinations thereof, and may utilize a variety of networking protocols now available or later developed including, but not limited to TCP/IP based networking protocols.

The first user device 106 may refer to a user device associated with a first user (e.g., first employee) and may be a cellular telephone (e.g., a smartphone and/or other type of mobile telephone), laptop, tablet, electronic reader, e-book device, media device, wearable, smart glasses, smartwatch, or any combination of the above. Similarly, the second user device 108 may refer to a user device associated with a second user (e.g., second employee) and may also be a cellular telephone (e.g., a smartphone and/or other type of mobile telephone), laptop, tablet, electronic reader, e-book device, media device, wearable, smart glasses, smartwatch, or any combination of the above. Although only a first user device 106 and a second user device 108 are illustrated, the example system 100 may include any number of user devices associated with the same user or any number of respective other users (e.g., any number of employees).

The employee data database 110 may be stored by any suitable storage device configured to store some or all of the information described herein (e.g., memory 204 of the absence management server 200 or a separate memory system separate from the absence management server 200, such as one or more database systems, backend data servers, network databases, cloud storage devices, or the like provided by another device (e.g., online application or $3^{rd}$ party provider) or the first or second user devices 106, 108). The employee data database 110 may comprise data received from the absence management server 200 (e.g., via a memory 204 and/or processor(s) 202), the first user device 106, or the second user device 108, and the corresponding storage device may thus store this data.

Figure 2:
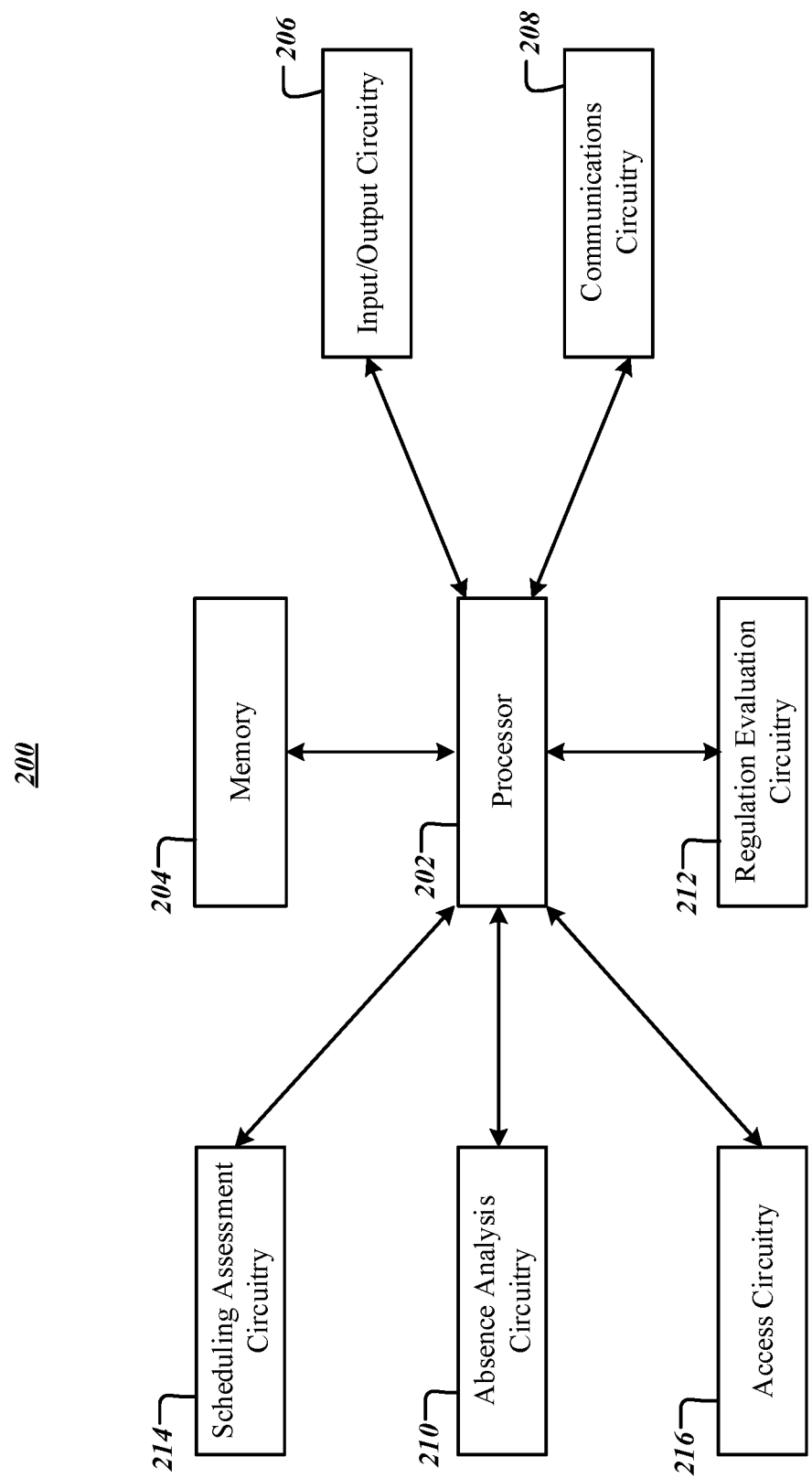
FIG. 2 illustrates a schematic block diagram of example circuitry that may perform various operations, in accordance with some example embodiments described herein.

As illustrated in FIG. 2, the absence management server 200 may include a processor 202, a memory 204, communications circuitry 208, and input/output circuitry 206. Moreover, the absence management server 200 may include absence analysis circuitry 210, regulation evaluation circuitry 212, access circuitry 216, and scheduling assessment circuitry 214. The absence management server 200 may be configured to execute the operations described below in connection with FIGS. 3-9. Although components 202-216 are described in some cases using functional language, it should be understood that the particular implementations necessarily include the use of particular hardware. It should also be understood that certain of these components 202-216 may include similar or common hardware. For example, two sets of circuitry may both leverage use of the same processor 202, memory 204, communications circuitry 208, or the like to perform their associated functions, such that duplicate hardware is not required for each set of circuitry. The use of the term "circuitry" as used herein includes particular hardware configured to perform the functions associated with respective circuitry described herein. As described in the example above, in some embodiments, various elements or components of the circuitry of the absence management server 200 may be housed within the first user device 106, and/or the second user device 108. It will be understood in this regard that some of the components described in connection with the absence management server 200 may be housed within one of these devices, while other components are housed within another of these devices, or by yet another device not expressly illustrated in FIG. 1.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the absence management server 200 may provide or supplement the functionality of particular circuitry.

In some embodiments, the processor 202 (and/or co-processor or any other processing circuitry assisting or otherwise associated with the processor) may be in communication with the memory 204 via a bus for passing information among components of the absence management server 200. The memory 204 may be non-transitory and may include, for example, one or more volatile and/or non-volatile memories. In other words, for example, the memory may be an electronic storage device (e.g., a non-transitory computer readable storage medium). The memory 204 may be configured to store information, data, content, applications, instructions, or the like, for enabling the absence management server 200 to carry out various functions in accordance with example embodiments of the present invention.

The processor 202 may be embodied in a number of different ways and may, for example, include one or more processing devices configured to perform independently. Additionally, or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the absence management server, and/or remote or "cloud" processors.

In an example embodiment, the processor 202 may be configured to execute instructions stored in the memory 204 or otherwise accessible to the processor 202. Alternatively, or additionally, the processor 202 may be configured to execute hard-coded functionality. As such, whether configured by hardware or by a combination of hardware with software, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

The absence management server 200 further includes input/output circuitry 206 that may, in turn, be in communication with processor 202 to provide output to a user and to receive input from a user, user device, or another source. In this regard, the input/output circuitry 206 may comprise a display that may be manipulated by a mobile application. In some embodiments, the input/output circuitry 206 may also include additional functionality such as a keyboard, a mouse, a joystick, a touch screen, touch areas, soft keys, a microphone, a speaker, or other input/output mechanisms. The processor 202 and/or user interface circuitry comprising the processor 202 may be configured to control one or more functions of a display through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the absence management server 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s). These signals may be transmitted by the absence management server 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

The absence analysis circuitry 210 includes hardware components designed to identify employee data subject to a required absence regulation. The absence analysis circuitry 210 may utilize processing circuitry, such as the processor 202, to perform its corresponding operations, and may utilize memory 204 to store collected information. By way of example, in some instances, the absence analysis circuitry 210 may further identify a change in employee status.

The regulation evaluation circuitry 212 includes hardware components designed to determine if identified employee data satisfies required absence regulations. The regulation evaluation circuitry 212 may be configured to, in an instance in which identified employee data satisfies a required absence regulation, generate a compliance confirmation. The regulation evaluation circuitry 212 may be configured to, in an instance in which identified employee data fails to satisfy a required absence regulation, generate a noncompliance notification. The regulation evaluation circuitry 212 may utilize processing circuitry, such as the processor 202, to perform its corresponding operations, and may utilize memory 204 to store collected information.

The scheduling assessment circuitry 214 includes hardware components designed to determine a workforce availability. The scheduling assessment circuitry 214 may be configured to, in an instance in which the workforce availability fails to satisfy an availability threshold, generate a noncompliance notification, generate an insufficient availability notification, and/or generate a remedial absence schedule. The scheduling assessment circuitry 214 may utilize processing circuitry, such as the processor 202, to perform its corresponding operations, and may utilize memory 204 to store collected information.

Access circuitry 216 includes hardware components designed to control access of the first user device 106, the second user device 108, and/or other devices not illustrated in FIGS. 1-2. For example, the access circuitry 216 may generate an access attempt notification in an instance in which an employee is subject to the required absence regulation. In an instance in which an employee fails to satisfy a required absence regulation, the access circuitry 216 may generate an access schedule update or reject a request for access by a user device (e.g., associated with an employee). Access circuitry 216 may utilize processing circuitry, such as the processor 202, to perform its corresponding operations, and may utilize memory 204 to store collected information.

It should also be appreciated that, in some embodiments, the absence analysis circuitry 210, regulation evaluation circuitry 212, access circuitry 216, or scheduling assessment circuitry 214 may include a separate processor, specially configured field programmable gate array (FPGA), or application specific interface circuit (ASIC) to perform its corresponding functions.

In addition, computer program instructions and/or other type of code may be loaded onto a computer, processor, or other programmable absence management server's circuitry to produce a machine, such that the computer, processor other programmable circuitry that execute the code on the machine create the means for implementing the various functions, including those described in connection with the components of absence management server 200.

As described above and as will be appreciated based on this disclosure, embodiments of the present invention may be configured as systems, methods, mobile devices, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Example Operations for Regulated Absence Management

Figure 3:
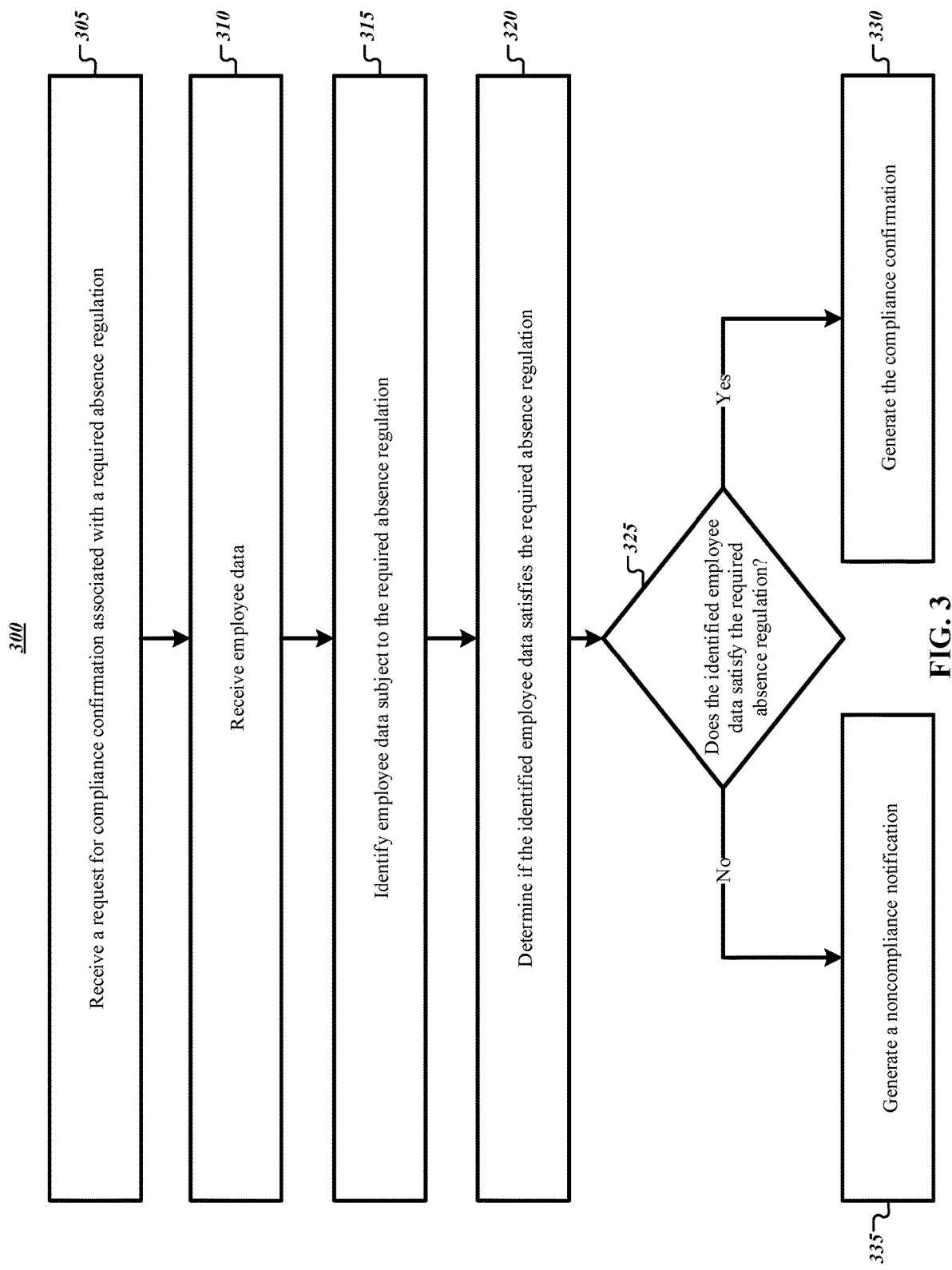
FIG. 3 illustrates an example flowchart for regulated absence management, in accordance with some example embodiments described herein.

FIG. 3 illustrates a flowchart containing a series of operations for regulated absence management. The operations illustrated in FIG. 3 may, for example, be performed by, with the assistance of, and/or under the control of an apparatus (e.g., absence management server 200), as described above. In this regard, performance of the operations may invoke one or more of processor 202, memory 204, input/output circuitry 206, communications circuitry 208, absence analysis circuitry 210, regulation evaluation circuitry 212, access circuitry 216, and/or scheduling assessment circuitry 214.

As shown in operation 305, the apparatus (e.g., absence management server 200) includes means, such as input/output circuitry 206, communications circuitry 208, or the like, for receiving a request for compliance confirmation associated with a required absence regulation. In some example embodiments, the communications circuitry 208 may receive a request for compliance confirmation from a first user device 106, a second user device 108, or another device not explicitly illustrated in FIG. 1. In some embodiments, the request for compliance confirmation may be received from a regulatory agency and may request compliance conformation at operation 305 in order to determine if the employees of the entity of the absence management server 200 satisfy associated required absence regulations specified by this agency (e.g., an external audit request). In other embodiments, the communications circuitry 208 may receive a request for compliance confirmation as part of an internal audit or other internal system diagnostic in which the entity associated with the absence management server 200 determines its compliance with regard to a required absence regulation.

Thereafter, as shown in operation 310, the apparatus (e.g., absence management server 200) includes means, such as input/output circuitry 206, communication circuitry 208, or the like, for receiving employee data. As described hereafter with reference to FIG. 4, the absence management server 200 may be communicably coupled with an employee data database 110 configured to store employee data. In such an embodiment, the absence management server 200 may query the employee data database 110 to retrieve employee data for some or all of the employees of an entity associated with the absence management server 200. In other embodiments, one or more user devices (e.g., the first user device 106) may be communicably coupled with the absence management server 200 via the network 104 such that the user devices (e.g., first user device 106 or second user device 108) may transmit an absence plan including employee data received by the absence management server 200. By way of example, the first user device 106 associated with a first employee may receive an input from the first employee regarding scheduling vacation or other time absent from his or her position. As described hereafter, the absence management server 200 may be configured to receive this input from the first user device 106 as an absence plan associated with the first user device 106 and associated first employee.

Thereafter, as shown in operation 315, the apparatus (e.g., absence management server 200) includes means, such as processor 202, absence analysis circuitry 210, or the like, for identifying employee data subject to the required absence regulation. As described hereafter with reference to FIG. 4, the employee data received by the absence management server 200 at operation 310 may be analyzed by the absence analysis circuitry 210 in order to identify one or more employee statuses associated with the employee data. In some embodiments in which the absence analysis circuitry 210 queries the employee data database 110, the employee data stored by the employ data database 110 may include one or more employee statuses associated with each employee (e.g., with each employee data entry). By way of example, each employee data entry may be associated with a position title (e.g., manager, sensitive employee, etc.) that indicates that the employee associated with the employee data entry is subject to the required absence regulation. In some instances, the position title may refer a role or employee code that may be analyzed by the absence analysis circuitry 210 in order to identify employee data that is subject to the required absence regulation.

In other embodiments, such as embodiments in which the absence management server 200 receives an absence plan from a user device 106, 108, the status associated with the employee may be indicated via submission of the absence plan. By way of example, each employee of an entity located in a sensitive position may be required by the entity to submit an absence plan indicating how the employee will comply with the required absence regulation applicable to said position. As such, in instances in which the absence management server 200 receives an absence plan, the absence analysis circuitry 210 may identify the employee associated with the received absence plan as an employee subject to the required absence regulation. As described hereafter with reference to FIG. 5, the status of one or more employees may further change. For example, an employee may change roles such that his or her new role is subject to the required absence regulation while his or her prior role was not subject to the required absence regulation. As such and as described hereafter, the absence management server 200 may iteratively identify employee data subject to the required absence regulation to ensure continuous regulatory compliance.

Thereafter, as shown in operations 320 and 325, the apparatus (e.g., absence management server 200) includes means, such as the processor 202, the regulation evaluation circuitry 212, or the like, for determining if the identified employee data satisfies the required absence regulation. As described above, the required absence regulation may dictate that employees in sensitive roles (e.g., employee data identified at operation 315) be absent from their roles for a prescribed period of time (e.g., two weeks, ten consecutive days, etc.). In order to determine if the identified employee data satisfies the required absence regulation, the regulation evaluation circuitry 212 may, in some embodiments, ensure that each employee (e.g., each employee data entry) identified at operation 315 has previously been absent from their respective role for the time period prescribed by the required absence regulation. In some embodiments, however, the number of employees (e.g., employee data) that has previously-complied with the required absence regulation may not be sufficient for the entity associated with the absence management server 200 to comply with the required absence regulation. By way of example, many employees may plan to meet the required absent time at a future date. As such, in some embodiments, the regulation evaluation circuitry 212 may determine that the identified employee data satisfies the required absence regulation in instances in which employee data that has not previously-satisfied the regulation has submitted (e.g., received at operation 310) an absence plan. As described above, the absence management server 200 may further identify status changes for employee data as described hereafter (e.g., a change in absence plan) and subsequently determine if the identified employee data satisfies the required absence regulation based upon the status changes.

In an instance in which the identified employee data satisfies the required absence regulation at operations 320, 325, the apparatus (e.g., absence management server 200) includes means, such as processor 202, communications circuitry 208, or the like, for generating the compliance confirmation at operation 330. By way of example, in some embodiments, the absence management server 200 may transmit a compliance confirmation to a regulatory agency as described above indicating that the entity associated with the absence management server 200 is in compliance with the required absence regulation. In an instance in which the identified employee data fails to satisfy the required absence regulation at operations 320, 325, the apparatus (e.g., absence management server 200) includes means, such as processor 202, communications circuitry 208, or the like, for generating a noncompliance notification at operation 335. By way of continued example, in some embodiments, the absence management server 200 may transmit a noncompliance notification to the regulatory agency as described above indicating that the entity associated with the absence management server 200 is not yet in compliance with the required absence regulation. As described herein, the absence management server may iteratively perform the operations illustrated in FIG. 3 to either ensure continued compliance or to identify when previously noncompliant employee data satisfies the required absence regulation.

Figure 4:
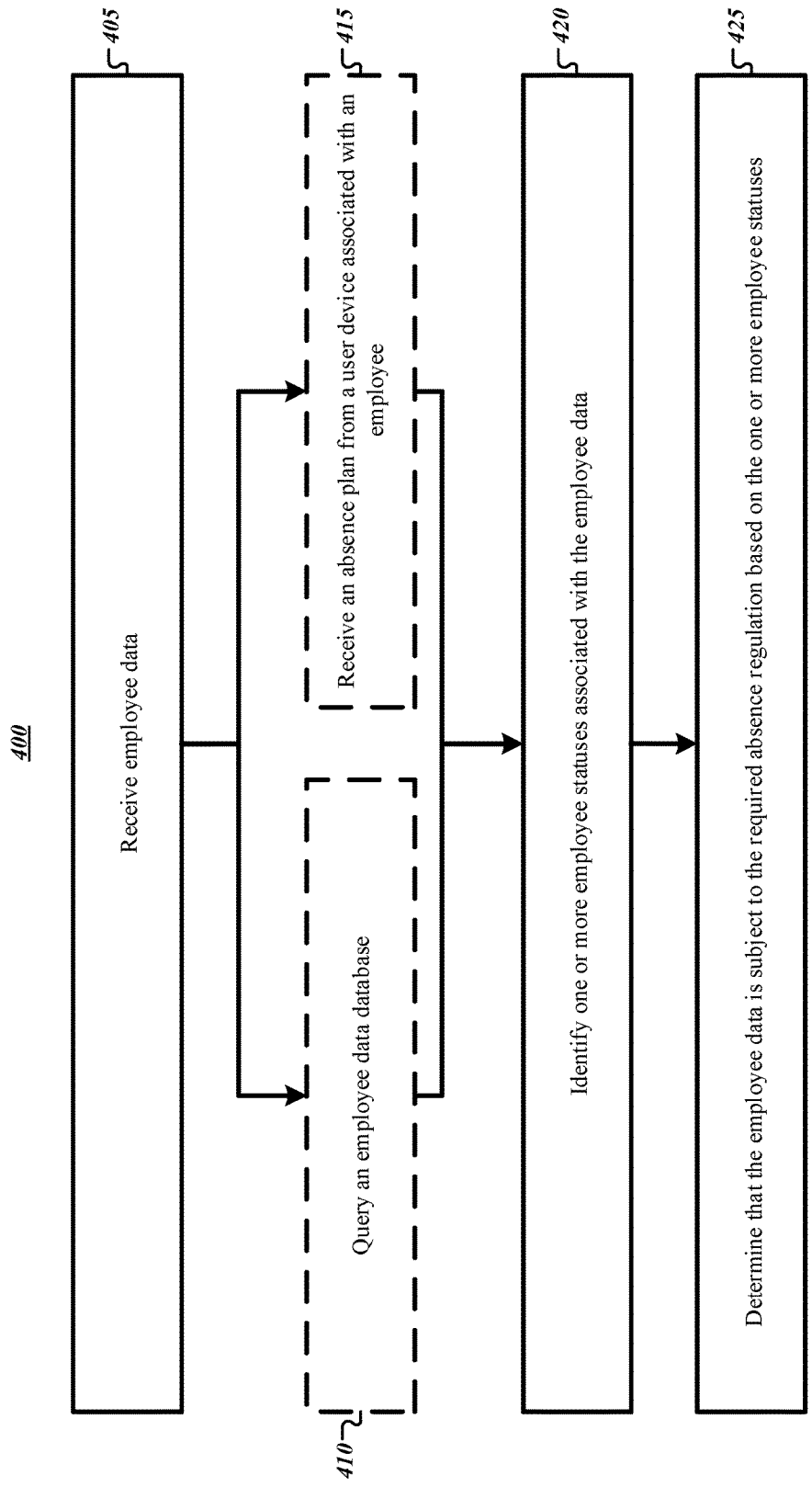
FIG. 4 illustrates an example flowchart for employee status identification, in accordance with some example embodiments described herein.

Turning next to FIG. 4, a flowchart is shown for employee status identification. The operations illustrated in FIG. 4 may, for example, be performed by, with the assistance of, and/or under the control of an apparatus (e.g., absence management server 200), as described above. In this regard, performance of the operations may invoke one or more of processor 202, memory 204, input/output circuitry 206, communications circuitry 208, absence analysis circuitry 210, regulation evaluation circuitry 212, access circuitry 216, and/or scheduling assessment circuitry 214.

As shown in operation 405, the apparatus (e.g., absence management server 200) includes means, such as input/output circuitry 206, communications circuitry 208, or the like, for receiving employee data. As described above with reference to operation 310, the apparatus may be communicably coupled with an employee data database 110 that is configured to store employee data. As shown in operation 410, the absence management server 200 may query the employee data database 110 to retrieve employee data for some or all of the employees of an entity associated with the absence management server 200.

As shown in operation 415, the apparatus (e.g., absence management server 200) includes means, such as input/output circuitry 206, communications circuitry 208, or the like, for receiving an absence plan from a user device associated with an employee. As described above, one or more user devices (e.g., the first user device 106) may be communicably coupled with the absence management server 200 via the network 104 such that the user devices (e.g., first user device 106) may transmit an absence plan including employee data to be received by the absence management server 200. By way of example, the first user device 106 associated with a first employee may receive an input from the first employee regarding scheduling vacation or other time absent from his or her position. As described hereafter, the absence management server 200 may be configured to receive this input from the first user device 106 as an absence plan (e.g., including employee data) associated with the first user device 106 and associated first employee.

Thereafter, as shown in operation 420, the apparatus (e.g., absence management server 200) includes means, such as processor 202, regulation evaluation circuitry 212, or the like, for identifying one or more employee statuses associated with the employee data. The employee data received by the absence management server 200 at operations 405-415 may be analyzed by the absence analysis circuitry 210 in order to identify one or more employee statuses associated with the employee data. In some embodiments in which the absence analysis circuitry 210 queries the employee data database 110, the employee data stored by the employ data database 110 may include one or more employee statuses associated with each employee (e.g., with each employee data entry). By way of example, each employee data entry may be associated with a position title (e.g., manager, sensitive employee, etc.) that indicates that the employee associated with the employee data entry is subject to the required absence regulation. In some instances, the position title may refer a role or employee code that may be analyzed by the absence analysis circuitry 210 in order to identify employee data that is subject to the required absence regulation. In instances in which the employee data (e.g., employee position or role code) is not indicative of the status of the employee, the regulation evaluation circuitry 212 may be configured to employ natural language processing (NLP) or equivalent techniques to evaluate free form text (e.g., emails, time entries, etc.) in order to identify the status associated with the employee data.

In other embodiments, such as embodiments in which the absence management server 200 receives an absence plan from a user device 106, 108, the status associated with the employee may be indicated via submission of the absence plan. As described above, each employee of an entity located in a sensitive position may be required by the entity to submit an absence plan indicating how the employee will comply with the required absence regulation applicable to said position. As such, in instances in which the absence management server 200 receives an absence plan, the absence analysis circuitry 210 and/or regulation evaluation circuitry 212 may identify the employee status based on the absence plan submission.

Thereafter, as shown in operation 425, the apparatus (e.g., absence management server 200) includes means, such as processor 202, regulation evaluation circuitry 212, or the like, for determining that the employee data is subject to the required absence regulation based on the one or more employee statuses. As described above, the one or more employee statuses identified at operation 420 may indicate if the employee data is subject to the required absence regulation. By way of example, an identified employee status that is associated with a sensitive position (e.g., high financial or legal risk position) may indicate that the employee is subject to the required absence regulation. Although described herein with reference to employee positions or role codes as employee statuses, the present disclosure contemplates that employee data and associated statuses may include any information indicative of the employee's role within the entity. Employee data that does not include a role code tied to a sensitive position but that otherwise includes contextual data indicative of regulation applicability may be identified. For example, user contextual data (e.g. location, timing, etc.) may be identified at operation 420 and used to determine that employee data is subject to the required absence regulation at operation 425.

Figure 5:
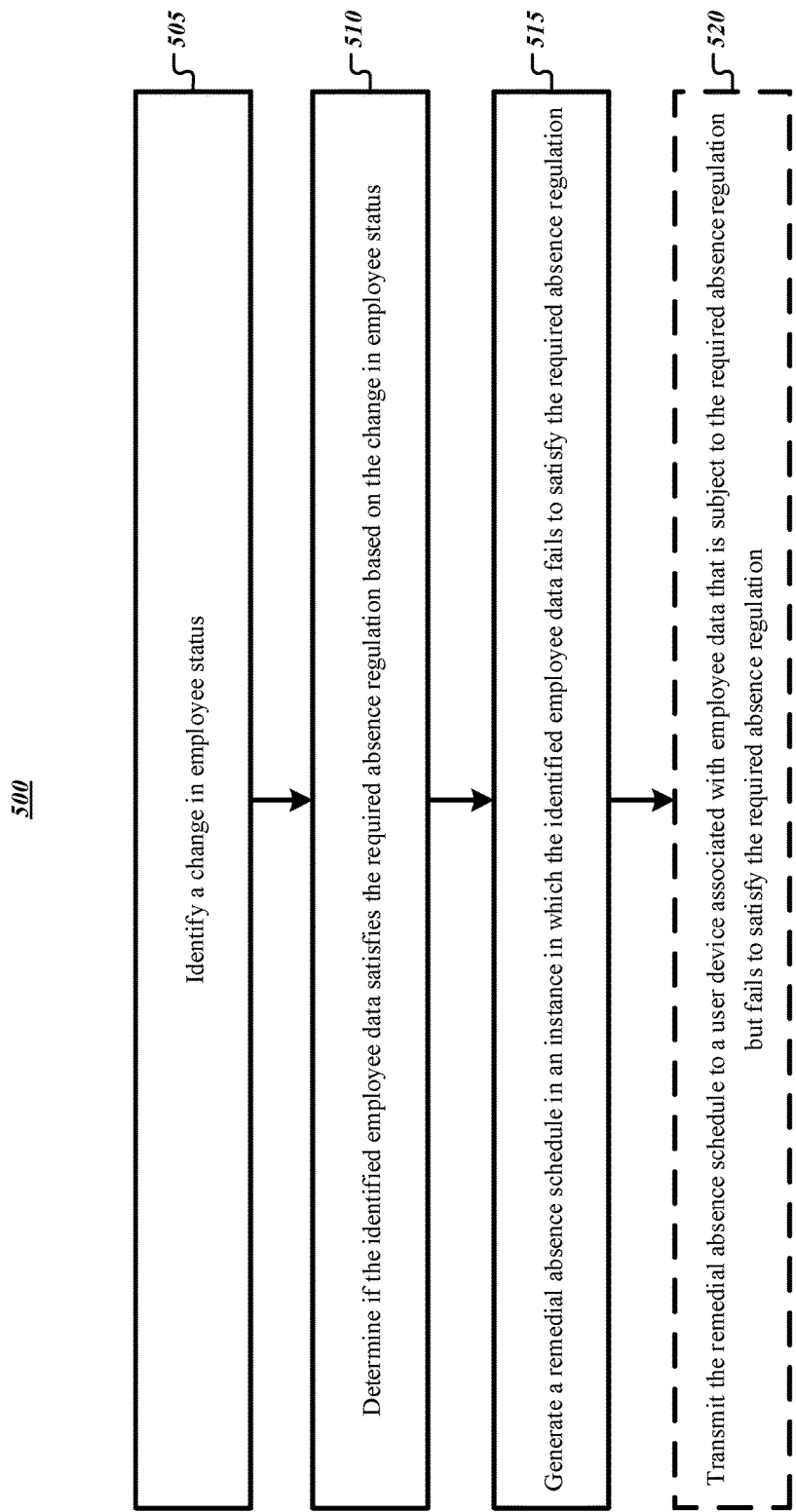
FIG. 5 illustrates an example flowchart for remedial absence schedule generation, in accordance with some example embodiments described herein.

Turning next to FIG. 5, a flowchart is shown for remedial absence schedule generation. The operations illustrated in FIG. 5 may, for example, be performed by, with the assistance of, and/or under the control of an apparatus (e.g., absence management server 200), as described above. In this regard, performance of the operations may invoke one or more of processor 202, memory 204, input/output circuitry 206, communications circuitry 208, absence analysis circuitry 210, regulation evaluation circuitry 212, access circuitry 216, and/or scheduling assessment circuitry 214.

As shown in operation 505, the apparatus (e.g., absence management server 200) includes means, such as input/output circuitry 206, regulation evaluation circuitry 212, or the like, for identifying a change in employee status. As described above, over time the status of an employee and associated employee data may change. For example, in some instances, an employee having a role that is subject to the required absence regulation may change roles (e.g., a change in employee status) to a role that is not subject to the required absence regulation. In such an example, the apparatus (e.g., absence management server 200) includes means, such as input/output circuitry 206, regulation evaluation circuitry 212, or the like, for determining if the identified employee data satisfies the required absence regulation based on the change in employee status at operation 510. Given that the employee's role (e.g., employee status) has changed to a role that is not subject to the required absence regulation, the apparatus 200 may determine that the identified employee data continues to satisfy the required absence regulation.

In other embodiments, however, an employee may change from a role (e.g., a change in employee status) that is not subject to the required absence regulation to a role that is subject to the required absence regulation. In such an example, the regulation evaluation circuitry 212 may determine that the identified employee data does not satisfy the required absence regulation based on the change in employee status at operation 510. Given that the employee's role (e.g., employee status) has changed to a role that is subject to the required absence regulation, the apparatus 200 may determine that the employee is in noncompliance with the required absence regulation such that the entity is now in noncompliance with the regulation.

In some still further embodiments, the change in employee status may not refer to a change in employee role but may instead refer to a deviation from an absence plan associated with the employee (e.g., and employee data). By way of example, the absence management server 200 may receive an absence plan from a user device 106 associated with an employee as described above with reference to operation 415. Based on this absence plan (e.g., scheduled time away), the regulation evaluation circuitry 212 may determine that the employee data satisfies the required absence regulation. If, however, during the absence plan the first user device 106 logs onto or is otherwise detected by the absence management server 200 as described hereafter and/or the employee fails to take the required time away (e.g., detected via contextual data or the like), a change in employee status may be identified at operation 505. In such an example, the regulation evaluation circuitry 212 may determine that the identified employee data fails to satisfy the required absence regulation based on the change in employee status (e.g., a change in absence plan).

Thereafter, as shown in operation 515, the apparatus (e.g., absence management server 200) includes means, such as processor 202, scheduling assessment circuitry 214, or the like, for generating a remedial absence schedule in an instance in which the identified employee data fails to satisfy the required absence regulation. In an instance in which a noncompliance notification is generated at operation 335 and/or in an instance in which the change in status is determined to fail to satisfy the required absence regulation at operation 510, scheduling assessment circuitry 214 may be configured to generate a remedial schedule that places the employee data in compliance with the required absence regulation. By way of example, in an instance in which an employee changes from a role (e.g., a change in employee status) that is not subject to the required absence regulation to a role change roles) to a role that is subject to the required absence regulation, the scheduling assessment circuitry 214 may identify noncompliance with the required absence regulation and schedule (e.g., transmit a notification, prevent access to entity systems, etc.) the required time away for the employee associated with the noncompliant employee data. In instances in which an absence plan is modified as described above, the scheduling assessment circuitry 214 may, in some embodiments, transmit the remedial absence schedule to a user device 106 associated with employee data that is subject to the required absence regulation but fails to satisfy the required absence regulation as shown at operation 520.

Example Operations for Dynamic Absence Organization

Figure 6:
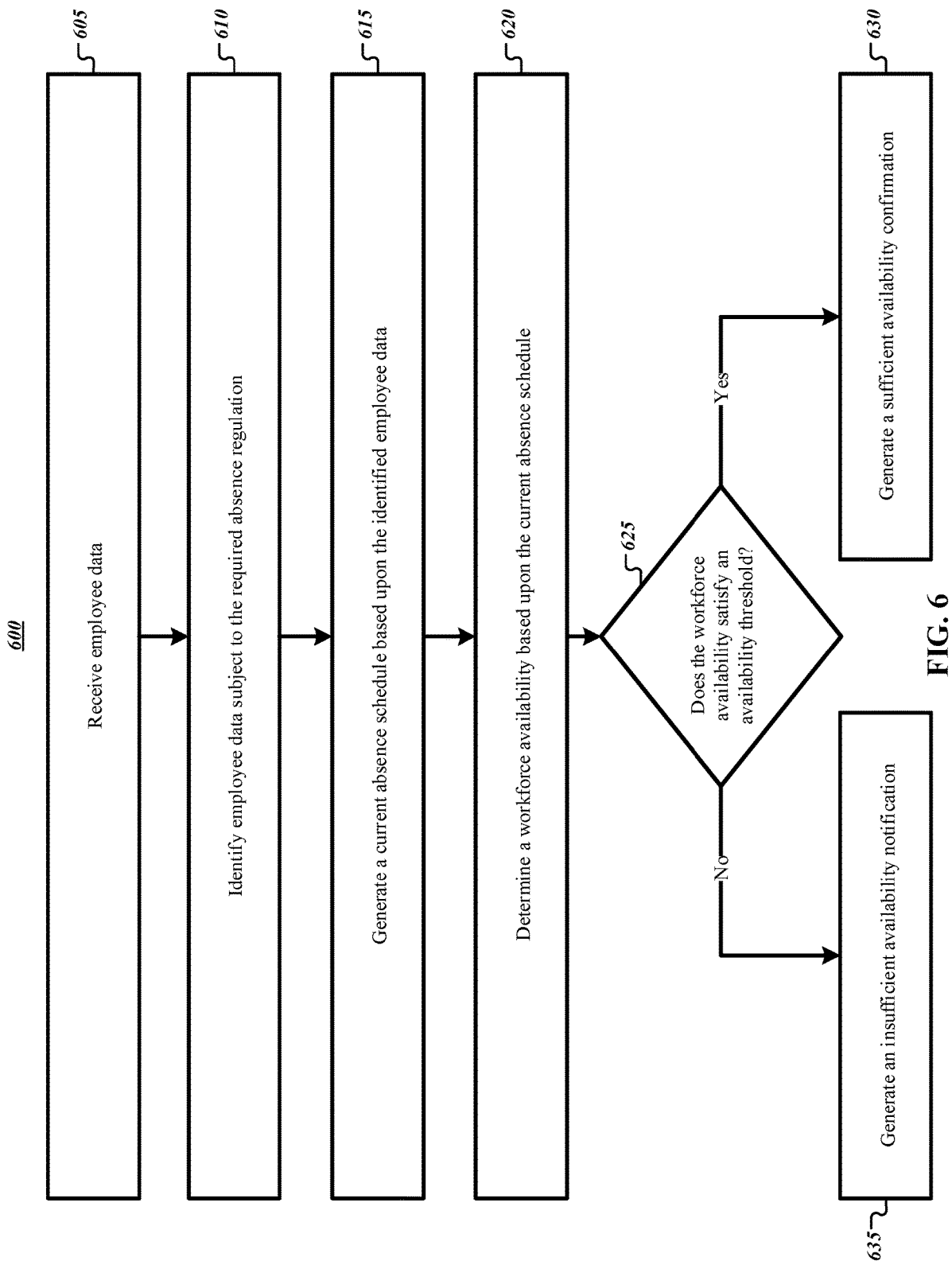
FIG. 6 illustrates an example flowchart for dynamic absence organization, in accordance with some example embodiments described herein.

FIG. 6 illustrates a flowchart containing a series of operations for dynamic absence organization. The operations illustrated in FIG. 6 may, for example, be performed by, with the assistance of, and/or under the control of an apparatus (e.g., absence management server 200), as described above. In this regard, performance of the operations may invoke one or more of processor 202, memory 204, input/output circuitry 206, communications circuitry 208, absence analysis circuitry 210, regulation evaluation circuitry 212, access circuitry 216, and/or scheduling assessment circuitry 214.

As shown in operation 605, the apparatus (e.g., absence management server 200) includes means, such as input/output circuitry 206, communication circuitry 208, or the like, for receiving employee data. As described above with reference to FIGS. 3-4, the absence management server 200 may be communicably coupled with an employee data database configured to store employee data. In such an embodiment, the absence management server 200 may query the employee data database 110 to retrieve employee data for some or all of the employees of an entity associated with the absence management server 200. In other embodiments, one or more user devices (e.g., the first user device 106) may be communicably coupled with the absence management server 200 via the network 104 such that the user devices (e.g., first user device 106 or second user device 108) may transmit an absence plan including employee data to be received by the absence management server 200. By way of example, the first user device 106 associated with a first employee may receive an input from the first employee regarding scheduling vacation or other time absent from his or her position. As described hereafter, the absence management server 200 may be configured to receive this input from the first user device 106 as an absence plan associated with the first user device 106 and associated first employee.

Thereafter, as shown in operation 610, the apparatus (e.g., absence management server 200) includes means, such as processor 202, absence analysis circuitry 210, or the like, for identifying employee data subject to the required absence regulation. As described above with reference to FIGS. 3-4, the employee data received by the absence management server 200 at operation 605 may be analyzed by the absence analysis circuitry 210 in order to identify one or more employee statuses associated with the employee data. In some embodiments in which the absence analysis circuitry 210 queries the employee data database 110, the employee data stored by the employ data database 110 may include one or more employee statuses associated with each employee (e.g., with each employee data entry). By way of example, each employee data entry may be associated with a position title (e.g., manager, sensitive employee, etc.) that indicates that the employee associated with the employee data entry is subject to the required absence regulation. In some instances, the position title may refer a role or employee code that may be analyzed by the absence analysis circuitry 210 in order to identify employee data that is subject to the required absence regulation.

In other embodiments, such as embodiments in which the absence management server 200 receives an absence plan from a user device 106, 108, the status associated with the employee may be indicated via submission of the absence plan. By way of example, each employee of an entity located in a sensitive position may be required by the entity to submit an absence plan indicating how the employee will comply with the required absence regulation applicable to said position. As such, in instances in which the absence management server 200 receives an absence plan, the absence analysis circuitry 210 may identify the employee associated with the received absence plan as an employee subject to the required absence regulation.

Thereafter, as shown in operation 615, the apparatus (e.g., absence management server 200) includes means, such as processor 202, schedule assessment circuitry 214, or the like, for generating a current absence schedule based upon the identified employee data. Following identification of employees that are subject to the required absence regulation, the schedule assessment circuitry 214 may analyze the employee data to generate a schedule of employee absences currently indicated for compliance. By way of example, the employee data received from the employee data database 110 may indicate employees that are subject to the required absence regulation, employees that have satisfied the required absence regulation (e.g., previously absent), and/or employees that have scheduled absences at a future date. Similarly, one or more employee absence plans received from user devices 106, 108 may also indicate completed or scheduled absences. Based on this employee data, the schedule assessment circuitry 214 may determine when each employee will be available for performing their respective roles. As such, as shown in operation 620, the apparatus (e.g., absence management server 200) includes means, such as processor 202, schedule assessment circuitry 214, or the like, for determining a workforce availability based upon the current absence schedule.

As described hereafter with reference to operations 620-635, the workforce availability may refer to the ability for employee that are subject to the required absence regulation to work during certain time periods while maintaining compliance with the required absence regulation. The availability threshold, however, refers to the required employees needed by the entity associated with the absence management server 200 to successfully complete its operations. In some instances, the availability threshold may refer to a minimum number of employees required to perform necessary operations for the entity as a whole. In other instances, the availability threshold may refer to a minimum number of employee roles required to perform certain operations for the entity.

Thereafter, as shown in operation 625, the apparatus (e.g., absence management server 200) includes means, such as processor 202, schedule assessment circuitry 214, or the like, for determining if the workforce availability satisfies the availability threshold. By way of example, a current absence schedule generated at operation 615 and workforce availability determined at operation 620 may ensure compliance with the required absence regulation. Such an absence schedule, however, may result in the entity lacking a minimum number of employees present to operate. By way of a particular example, employees may opt to schedule vacation during the end of the calendar year to align their vacation with holidays. Such a scheduling of vacation may result in employee data that satisfies the required absence regulation (e.g., all employees take off sufficient time), but the entity employing said employees may have insufficient employees to operate. In such an instance, the scheduling assessment circuitry 214 may generate an insufficient availability notification as illustrated at operation 635.

By way of an additional example, a current absence schedule generated at operation 615 and workforce availability determined at operation 620 may ensure compliance with the required absence regulation. Such an absence schedule, however, may result in the entity lacking a minimum number of employee roles required to perform certain operations for the entity. By way of a particular example, employees in a particular business unit or role may opt to attend an industry conference. Such a scheduling may result in employee data for these employee roles that satisfies the required absence regulation (e.g., all employees take off sufficient time), but the entity employing said employees may have insufficient employees skilled to perform certain operations. In such an instance, the scheduling assessment circuitry 214 may generate an insufficient availability notification as described hereafter with reference to operation 635.

In an instance in which the workforce availability satisfies the required availability threshold at operations 625, the apparatus (e.g., absence management server 200) includes means, such as processor 202, communications circuitry 208, or the like, for generating a sufficient availability confirmation at operation 630. By way of example, in some embodiments, the absence management server 200 may transmit a sufficient availability confirmation to one or more user devices 106, 108 providing confirmation that the current absence schedule complies with the required absence regulation.

Figure 7:
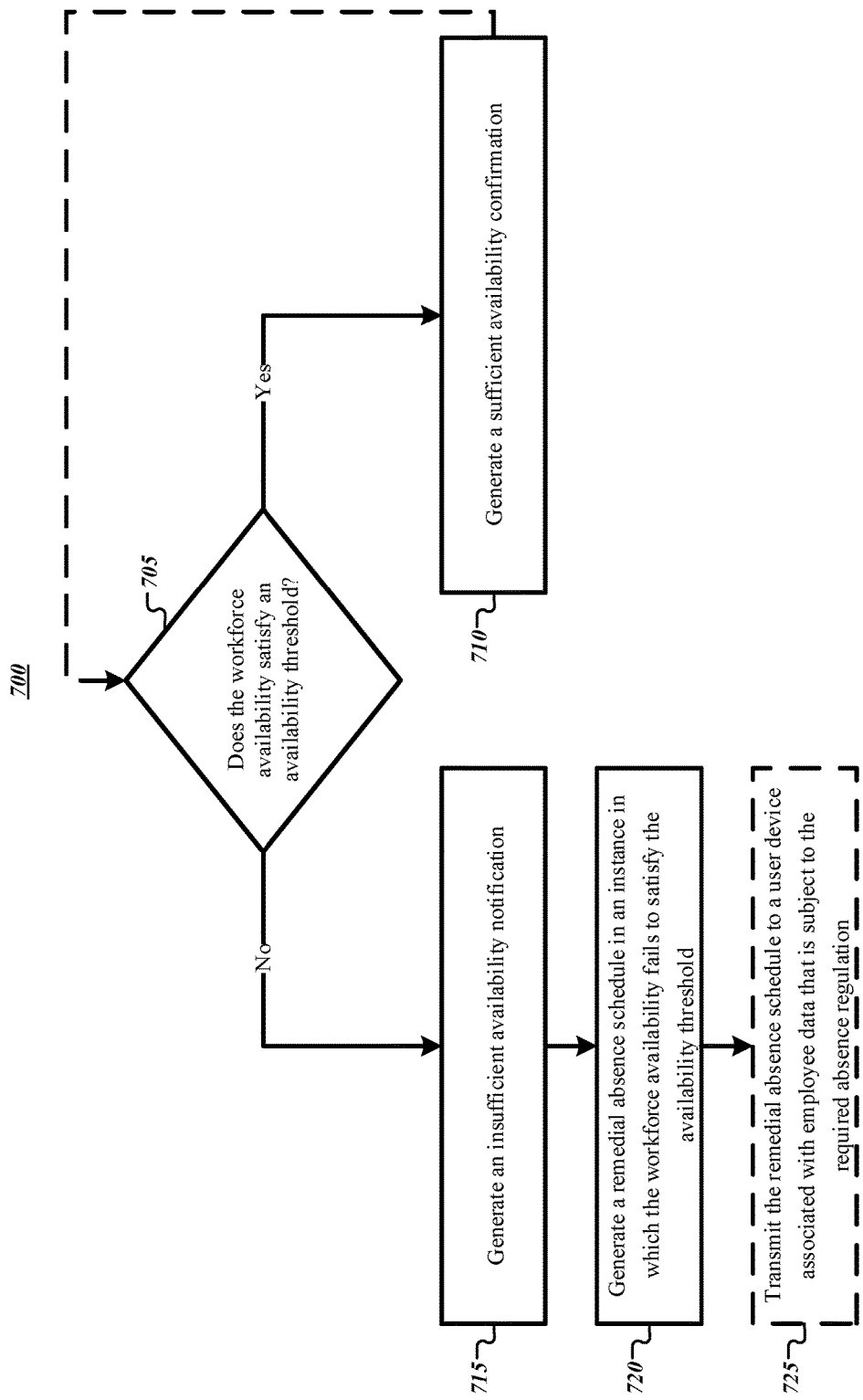
FIG. 7 illustrates an example flowchart for availability threshold determinations, in accordance with some example embodiments described herein.

Turning next to FIG. 7, a flowchart is shown for availability threshold determinations. The operations illustrated in FIG. 7 may, for example, be performed by, with the assistance of, and/or under the control of an apparatus (e.g., absence management server 200), as described above. In this regard, performance of the operations may invoke one or more of processor 202, memory 204, input/output circuitry 206, communications circuitry 208, absence analysis circuitry 210, regulation evaluation circuitry 212, access circuitry 216, and/or scheduling assessment circuitry 214.

As shown in operations 705, 710, and 715 the apparatus (e.g., absence management server 200) includes means, such as input/output circuitry 206, regulation evaluation circuitry 212, or the like, for determining if the workforce availability satisfies the availability threshold, generating a sufficient availability confirmation in an instance in which the workforce availability satisfies an availability threshold, and generating an insufficient availability notification in an instance in which the workforce availability fails to satisfy the availability threshold, respectively. In an instance in which the workforce availability fails to satisfy the availability threshold, the schedule assessment circuitry 214 may perform operations 720-725.

As shown in operation 720, the apparatus (e.g., absence management server 200) includes means, such as processor 202, schedule assessment circuitry 214, or the like, for generating a remedial absence schedule in an instance in which the workforce availability fails to satisfy the availability threshold. In an instance in which an insufficient availability notification is generated at operation 715, scheduling assessment circuitry 214 may be configured to generate a remedial schedule that maintain the employee data in compliance with the required absence regulation and further prevents operational concerns for the entity. By way of continued example, an absence schedule that results in the entity lacking a minimum number of employees present to operate and/or a minimum number of employee roles to perform certain operations may require a remedial absence schedule. As such, the scheduling assessment circuitry 214 may, for example, select employees (e.g. in general or with particular roles) and change scheduled absences for these employees (e.g., request other potential absent dates). The schedule assessment circuitry 214 may iteratively change scheduled absences until operational concerns are remedied and required absence regulation compliance is maintained. In instances in which a remedial absence plan is generate as described above, the scheduling assessment circuitry 214 may, in some embodiments, transmit the remedial absence schedule to a user device 106, 108 associated with employee data that is subject to the required absence regulation as shown at operation 725.

Example Operations for Regulated Access Management

Figure 8:
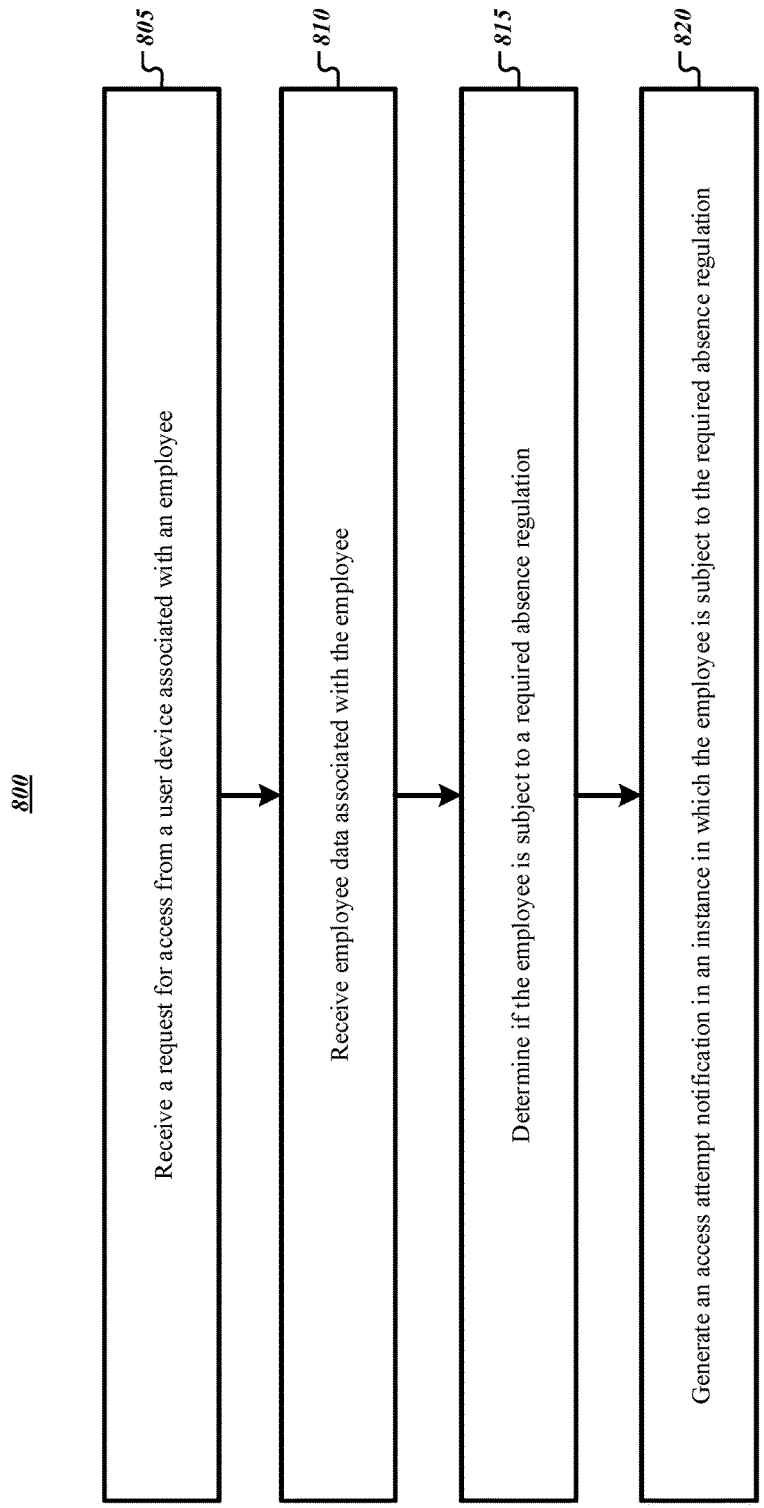
FIG. 8 illustrates an example flowchart for regulated access management, in accordance with some example embodiments described herein.

FIG. 8 illustrates a flowchart containing a series of operations for regulated access management. The operations illustrated in FIG. 8 may, for example, be performed by, with the assistance of, and/or under the control of an apparatus (e.g., absence management server 200), as described above. In this regard, performance of the operations may invoke one or more of processor 202, memory 204, input/output circuitry 206, communications circuitry 208, absence analysis circuitry 210, regulation evaluation circuitry 212, access circuitry 216, and/or scheduling assessment circuitry 214.

As shown in operation 805, the apparatus (e.g., absence management server 200) includes means, such as input/output circuitry 206, communications circuitry 208, access circuitry 216, or the like, for receiving a request for access from a user device 106 associated with an employee. By way of example, an employee of an entity may attempt to log into or otherwise access an entity's network (e.g., hosted by or associated with the absence management server 200). In other instances, the request for access may refer to the employee's attempt to enter a physical building, scan a key card, or the like. In any embodiment, the communication circuitry 208 of the absence management server 200 may receive a request for access from an employee (e.g., user device 106) and may determine via method 900 if access is permitted for the employee.

Thereafter, as shown in operation 810, the apparatus (e.g., absence management server 200) includes means, such as input/output circuitry 206, communication circuitry 208, access circuitry 216, or the like, for receiving employee data associated with the employee. As described above, the absence management server 200 may be communicably coupled with an employee data database configured to store employee data. In such an embodiment, the absence management server 200 may query the employee data database 110 to retrieve the employee data associated with the request for access. In other embodiments, one or more user devices (e.g., the first user device 106) may be communicably coupled with the absence management server 200 via the network 104 such that the user devices (e.g., first user device 106 or second user device 108) may transmit employee data associated with the employee. By way of example, the first user device 106 associated with a first employee may transmit employee data associated with the employee alongside the request for access received at operation 805.

Thereafter, as shown in operation 815, the apparatus (e.g., absence management server 200) includes means, such as processor 202, regulation evaluation circuitry 212, or the like, for determining if the employee is subject to a required absence regulation. As described above, the employee data received by the absence management server 200 may be analyzed by the regulation evaluation circuitry 212 in order to identify an employee status associated with the employee data. In some embodiments in which the regulation evaluation circuitry 212 queries the employee data database 110, the employee data stored by the employ data database 110 may include an employee status associated with the employee. By way of example, the employee data entries for the employee may be associated with a position title (e.g., manager, sensitive employee, etc.) that indicates that the employee is subject to the required absence regulation. In other embodiments, such as embodiments in which the absence management server 200 receives an absence plan from a user device 106, 108, the status associated with the employee may be indicated via submission of an absence plan or received alongside a request for access (e.g., the employee's title may be provided with the request for access).

In an instance in which the employee is subject to the required absence regulation, the apparatus (e.g., absence management server 200) includes means, such as processor 202, access circuitry 208, or the like, for generating an access attempt notification at operation 820. By way of example, in some embodiments, the absence management server 200 may transmit an access attempt notification to a business unit manager, regulatory compliance counsel, or other related employee or business unit in communication with the absence management server 200 such that this employee may generate an absence schedule update, reject the request for access, and/or permit the request for access as described hereafter with reference to FIG. 9.

Figure 9:
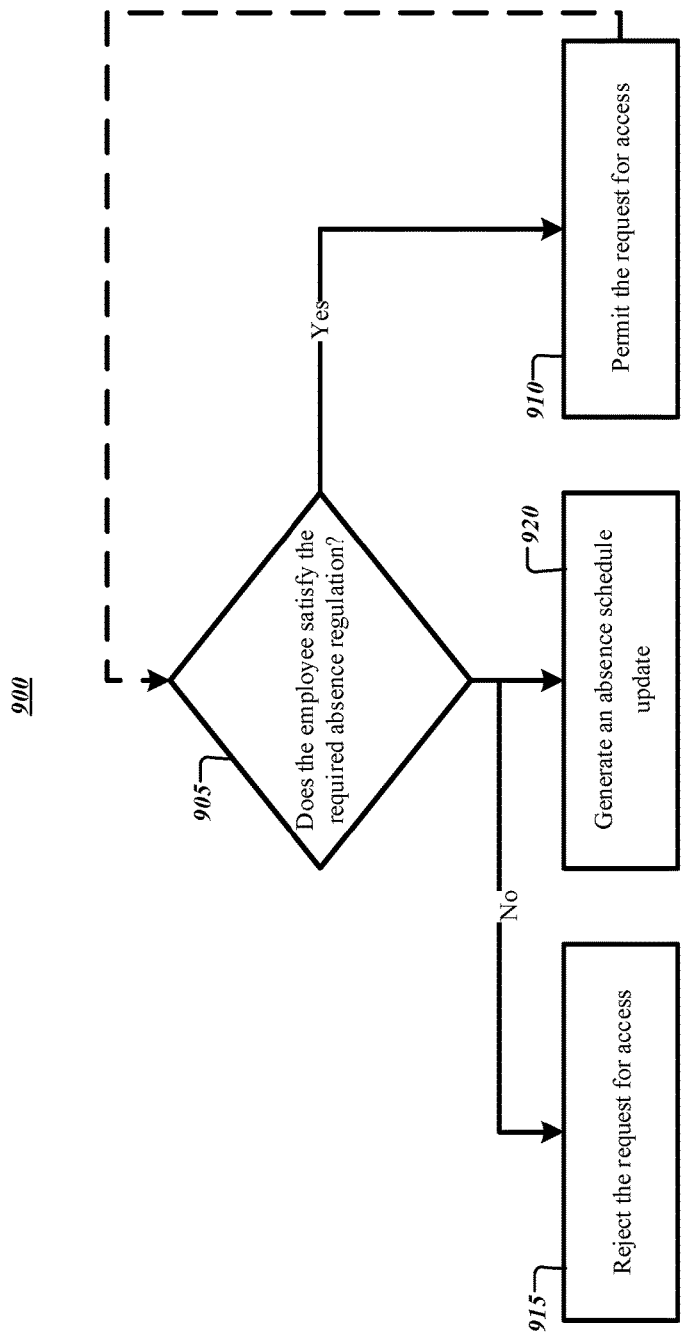
FIG. 9 illustrates an example flowchart for access request determinations, in accordance with some example embodiments described herein.

FIG. 9 illustrates a flowchart for access request determinations. The operations illustrated in FIG. 9 may, for example, be performed by, with the assistance of, and/or under the control of an apparatus (e.g., absence management server 200), as described above. In this regard, performance of the operations may invoke one or more of processor 202, memory 204, input/output circuitry 206, communications circuitry 208, absence analysis circuitry 210, regulation evaluation circuitry 212, access circuitry 216, and/or scheduling assessment circuitry 214.

As shown in operation 905, the apparatus (e.g., absence management server 200) includes means, such as input/output circuitry 206, regulation evaluation circuitry 212, access circuitry 216, or the like, for determining if the employee satisfies the required absence regulation. As described above, employees in sensitive roles may schedule time away (e.g., via an absence plan or the like) such that, during their scheduled absence, the employees are not allowed to have access to their duties. As such, at operation 905, the regulation evaluation circuitry 212 may determine if the employee associated with the request for access as described at operation 805 satisfies the required absence regulation. By way of example, the employee data of the employee associated with the request for access may indicate that the employee has already completed the required absent time denoted in the regulation. As such, the access circuitry 216 may, at operation 910, permit the request for access for such an employee. In some embodiments, the request for access from the employee may be associated with access to applications, features, etc. of the absence management server 200 independent from the sensitive roles identified by the required absence regulation. In such an embodiment, the access circuitry may permit the request for access at operation 910 but limit said access to applications, features, or the like that are separate from sensitive roles.

In an instance in which the employee fails to satisfy the required absence regulation at operation 905, the apparatus (e.g., absence management server 200) includes means, such as input/output circuitry 206, regulation evaluation circuitry 212, access circuitry 216, or the like, for rejecting the request for access and/or generating an absence schedule update at operations 915, 920, respectively. By way of example, the employee data of the employee associated with the request for access may indicate that the employee is currently scheduled for absent time from his or her sensitive role as denoted in the regulation. As such, the access circuitry 216 may, at operation 915, reject the request for access for such an employee in order to ensure required absence regulatory compliance is maintained. In other embodiments, however, the request for access may be permitted and the access circuitry may generate an absence schedule update. For example, the access circuitry 216 may generate an absence schedule update (e.g., a change in employee status) for analysis by the absence analysis circuitry 210 and the regulation evaluation circuitry 212 as described above with reference to FIG. 5.

As described above, various technical challenges are surmounted via technical solutions contemplated herein. For instance, example implementations of embodiments of the present invention utilize regulated absence management, dynamic absence organization, and regulated access in order to provide improved regulatory compliance and optimized workflow. In operation, embodiments of the present disclosure may receive a request for compliance confirmation, access, and/or employee data and, identify is the employee data is subject to required absence regulations. Based upon this determination, compliance confirmation, workforce availability, and/or access attempts may be effectively identified and addressed to ensure required absence compliance. In this way, the inventors have identified that the advent of emerging computing technologies have created a new opportunity for solutions for regulation compliance and employee scheduling which were historically unavailable. In doing so, such example implementations confront and solve at least three technical challenges: (1) they provide improved required absence compliance resulting in reduced fraud, (2) they reliably ensure optimal employee scheduling, and (3) they provide consistent employee access determinations.

FIGS. 3-9 thus illustrate flowcharts describing the operation of apparatuses, methods, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 204 of the absence management server 200 and executed by a processor 202 of the absence management server 200. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for electronic access management, the method comprising:
   receiving, via communication circuitry, an access request from a user device associated with an employee;
   receiving, via the communication circuitry, employee data comprising a current status associated with the employee;
   detecting absence compliance activity associated with the access request by:
      determining, via regulation evaluation circuitry, whether the employee is subject to a required absence regulation, wherein the required absence regulation defines a minimum amount of time during which the employee is required to be absent in order to deter the employee from conducting fraudulent activity related to a current role of the employee, and
      generating, via access circuitry, an access attempt notification in response to determining whether the employee is subject to the required absence regulation; and
   permitting or rejecting, via the access circuitry and in response to detecting the absence compliance activity, the access request.

2. The method according to claim 1, further comprising:
   querying, via absence analysis circuitry, an employee database; and
   identifying, via the absence analysis circuitry and based on the access request, the employee data in the employee database.

3. The method according to claim 1, further comprising:
   receiving, via the communication circuitry, an absence plan from the user device associated with the employee.

4. The method according to claim 1, further comprising:
   identifying, via the regulation evaluation circuitry, the current status from the employee data;
   determining, via the regulation evaluation circuitry, that the employee is subject to the required absence regulation based on the current status; and
   changing, via the regulation evaluation circuitry, the current status to an updated status indicating one or more of the absence compliance activity, permitting the access request, or rejecting the access request.

5. The method of claim 1, further comprising:
   in response to determining that the employee failed to satisfy the required absence regulation, further:
      determining that the current role of the employee specifies that the employee is not subject to the required absence regulation, and
      generating, via the access circuitry, an absence schedule update to change the current role of the employee to an updated role, wherein the updated role specifies that the employee holds a role that is subject to the required absence regulation.

6. The method according to claim 1, wherein the access request is rejected in response to determining that the employee failed to satisfy the required absence regulation.

7. The method according to claim 1, wherein the access request is permitted in response to determining that the employee satisfied the required absence regulation.

8. An apparatus for electronic access management, the apparatus comprising:
   communications circuitry configured to:
      receive an access request from a user device associated with an employee; and
      receive employee data comprising a current status associated with the employee;
   regulation evaluation circuitry and access circuitry configured to detect absence compliance activity associated with the access request from the user device,
      wherein the regulation evaluation circuitry is further configured to, whether the employee is subject to a required absence regulation, wherein the required absence regulation defines a minimum amount of time during which the employee is required to be absent in order to deter the employee from conducting fraudulent activity related to a current role of the employee, and
      wherein the access circuitry is further configured to generate an access attempt notification in response to determining whether the employee is subject to the required absence regulation; and
   wherein the access circuitry is further configured to permit or reject, in response to detecting the absence compliance activity, the access request.

9. The apparatus according to claim 8, further comprising absence analysis circuitry configured to:
   query an employee database; and
   identify, based on the access request, the employee data in the employee database.

10. The apparatus according to claim 8, wherein the communications circuitry is further configured to receive an absence plan from the user device associated with the employee.

11. The apparatus according to claim 8, wherein the regulation evaluation circuitry is further configured to:
   identify the current status from the employee data;
   determine that the employee is subject to the required absence regulation based on the current status; and
   change the current status to an updated status indicating one or more of the absence compliance activity, permitting the access request, or rejecting the access request.

12. The apparatus of claim 8, wherein the access circuitry is further configured to:

in response to determining that the employee failed to satisfy the required absence regulation, further:
    determine that the current role of the employee specifies that the employee is not subject to the required absence regulation, and
    generate an absence schedule update to change the current role of the employee to an updated role, wherein the updated role specifies that the employee holds a role that is subject to the required absence regulation.

13. The apparatus according to claim 8, wherein the access request is rejected in response to determining that the employee failed to satisfy the required absence regulation.

14. The apparatus according to claim 8, wherein the access request is permitted in response to determining that the employee satisfied the required absence regulation.

15. A non-transitory computer-readable storage medium for using an apparatus for electronic access management, the non-transitory computer-readable storage medium storing instructions that, when executed, cause the apparatus to:
    receive an access request from a user device associated with an employee;
    receive employee data comprising a current status associated with the employee;
    detect absence compliance activity associated with the access request by further causing the apparatus to:
        determine whether the employee is subject to a required absence regulation, wherein the required absence regulation defines a minimum amount of time during which the employee is required to be absent in order to deter the employee from conducting fraudulent activity related to a current role of the employee, and;
        generate an access attempt notification in response to determining whether the employee is subject to the required absence regulation; and
    permit or reject, in response to detecting the absence compliance activity, the access request.

16. The non-transitory computer-readable storage medium according to claim 15, wherein the instructions further cause the apparatus to:
    query an employee database; and
    identify, based on the access request, the employee data in the employee database.

17. The non-transitory computer-readable storage medium according to claim 15, wherein the instructions further cause the apparatus to:
    identify the current status from the employee data;
    determine that the employee is subject to the required absence regulation based on the current status; and
    change the current status to an updated status indicating one or more of the absence compliance activity, permitting the access request, or rejecting the access request.

18. The non-transitory computer-readable storage medium according to claim 15, wherein the instructions further cause the apparatus to:
    in response to determining that the employee failed to satisfy the required absence regulation, further:
        determine that the current role of the employee specifies that the employee is not subject to the required absence regulation, and
        generate an absence schedule update to change the current role of the employee to an updated role, wherein the updated role specifies that the employee holds a role that is subject to the required absence regulation.

19. The non-transitory computer-readable storage medium according to claim 15, wherein the access request is rejected in response to determining that the employee failed to satisfy the required absence regulation.

20. The non-transitory computer-readable storage medium according to claim 15, wherein the access request is permitted in response to determining that the employee satisfied the required absence regulation.

* * * * *